NONLINEAR DECODER

Filed March 27, 1968 3 Sheets-Sheet 1

Inventors
JOSEPH H. McNEILLY
ROGER A. MANSHIP
By Alfred C. Hill
Agent

Inventors
JOSEPH H. McNEILLY
ROGER A. MANSHIP
By Alfred C. Hill
Agent

Jan. 26, 1971 J. H. McNEILLY ET AL 3,559,079
NONLINEAR DECODER
Filed March 27, 1968 3 Sheets-Sheet 3

Inventors
JOSEPH H. Mc NEILLY
ROGER A. MANSHIP
By Alfred C. Hill
Agent

United States Patent Office 3,559,079

Patented Jan. 26, 1971

3,559,079
NONLINEAR DECODER

Joseph Hood McNeilly, Harlow, and Roger Alan Manship, Bishop's Stortford, England, assignors to International Standard Electric Corporation, New York, N.Y., a corporation of Delaware Filed Mar. 27, 1968, Ser. No. 716,643
Claims priority, application Great Britain, Apr. 21, 1967, 18,473/67
Int. Cl. H03k 5/20
U.S. Cl. 328—119 10 Claims

ABSTRACT OF THE DISCLOSURE

The input pulse code modulation (PCM) signal is converted to a pulse width modulation (PWM) signal whose width is proportional to the coded analog value. A capacitor is charged from a supply voltage for the duration of the PWM signal. The capacitor then discharges for a given time after which the voltage stored on the capacitor is sampled to provide an expanded pulse amplitude modulation signal. Due to supply voltage variation the capacitor can be charged too high or too low resulting in an error when the capacitor is sampled. This error is compensated for by employing a monostable circuit operating from the same supply voltage to control the time of sampling. Its time delay is adjusted to sample later if the supply voltage increases, or early if the supply voltage decreases.

BACKGROUND OF THE INVENTION

This invention relates to non-linear decoders, and more particularly to non-linear decoders in which sampling of a discharging capacitor takes place after a certain time to produce the pulse amplitude modulation output signal.

In a copending application of J. H. McNeilly, Ser. No. 709,617 filed Mar. 1, 1968 a non-linear decoder is disclosed wherein the pulse code modulation (PCM) input signal is converted to a pulse width modulation (PWM) signal having a width proportional to the numerical value represented by the PCM signal. The PWM controls the charging of a capacitor toward a supply voltage for a time $t'$ equal to the width of the PWM signal. The capacitor then discharges from time $t'$ to a fixed time T greater than $t'$. At time T the voltage stored on the capacitor is sampled to provide the pulse amplitude modulation (PAM) signal.

Since the sampled output voltage of a capacitor is directly proportional to the supply voltage which is used to charge the capacitor, any fluctuations in the supply voltages will affect the sampled output. The effect of such fluctuations is to cause a change in gain of the decoder and/or a change in the zero level condition in a decoder designed to give both positive and negative signal outputs.

SUMMARY OF THE INVENTION

Therefore, an object of this invention is to provide a non-linear decoder of the type described in the above cited copending application incorporating an arrangement to compensate for errors in the PAM output signal caused by supply voltage fluctuations.

A feature of this invention is the provision of a non-linear decoder comprising a first source of code signal; a second source of supply voltage; first means coupled to the first source and the second source to generate a first non-linear waveform in response to the supply voltage and the code signal, the first waveform having a fixed initial amplitude and varying therefrom according to a first law for a first time proportional to the numerical value represented by the code signal; second means coupled to the first means for generating a second non-linear waveform having an initial amplitude determined by the amplitude of the first waveform at the first time and varying therefrom according to a second given law; and third means coupled to the second means and the second source to sample the second waveform at a second time greater than the first time to provide an output signal for the decoder; the third means providing a variable second time in response to fluctuations of the supply voltage in such a way that error in the output signal due to fluctuations in the supply voltage is compensated for.

Another feature of this invention is the provision of the above mentioned third means including a trigger circuit in the form of a monostable circuit have a time constant which is dependent on the supply voltage.

BRIEF DESCIPTION OF THE DRAWINGS

The above-mentioned and other features and objects of this invention will become more apparent by reference to the following description taken in conjunction with the accompanying drawings in which.

DESCRIPTION OF THE PREFERRED EMBODIMENT

Figure 1:
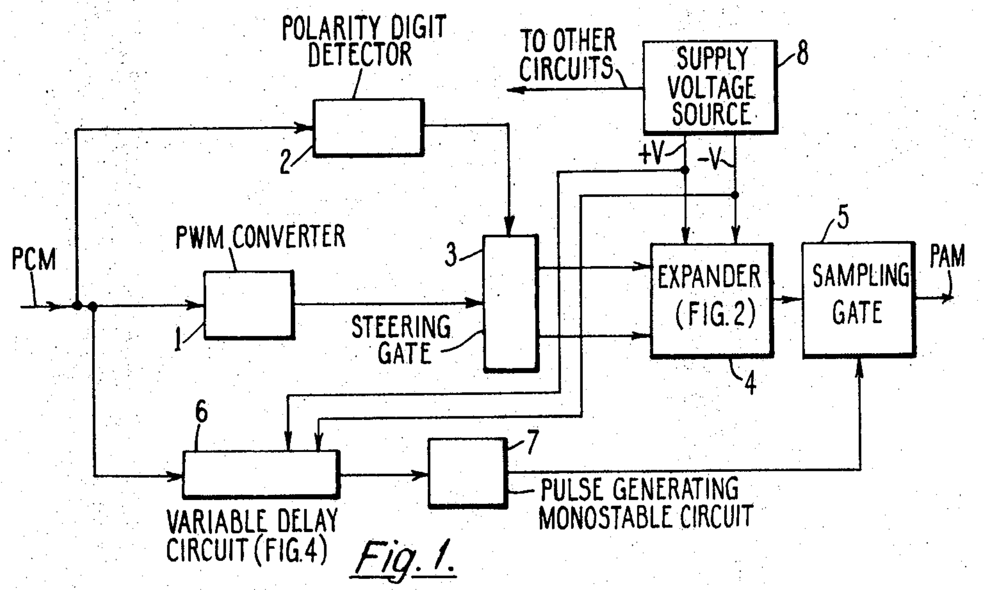
FIG. 1 is a block diagram of the decoder in accordance with the principles of this invention.

In the decoder illustrated in FIG. 1, the incoming PCM pulse group is a straightforward binary code signal and each digit position thereof has a weight according to a binary scale. Each code group includes $n$ digit pulses where the condition of the most significant weight pulse represents the polarity of the analog signal and the remaining $(n-1)$ digit pulses represent the magnitude of the analog signal. The PCM code groups are converted to a PWM signal by PWM converter 1. The details of converter 1 are disclosed in the above cited copending application. Briefly, converter 1 includes a shift register to store each digit of a code group and at the proper time the stored digits are transferred to a binary counter such that a "1" becomes a "0" and a "0" becomes a "1." At the time of transfer, a bistable device is switched to the "1" state. Clock pulses are then fed to the counter until a transition from all "1's" to all "0's" occurs. When this transition occurs the bistable device is switched to the "0" state. Thus, the output of the bistable device is the PWM output whose width is directly proportional to the analog or numerical value represented by the PCM signal value and is applied to steering gate 3 where it is steered into one of two paths according to the binary condition of the polarity digit (usually the most significant digit) which has been extracted from the PCM signal by polarity digit detector 2. In both cases, that is, whether the code signal is negative or positive the width modulated pulse is used to control the fixed rate of charging of a capacitor in expander 4 from the supply voltage provided by supply voltage source 8. Source 8 also provides this same supply voltage for variable delay circuit 6.

After a time $t'$, determined by the width of the PWM pulse, the capacitor ceases to charge and begins to discharge at a fixed rate until a predetermined time T has elapsed when the capacitor is sampled. The sampled condition of the capacitor is proportional to the originally encoded analog level.

Figure 2:
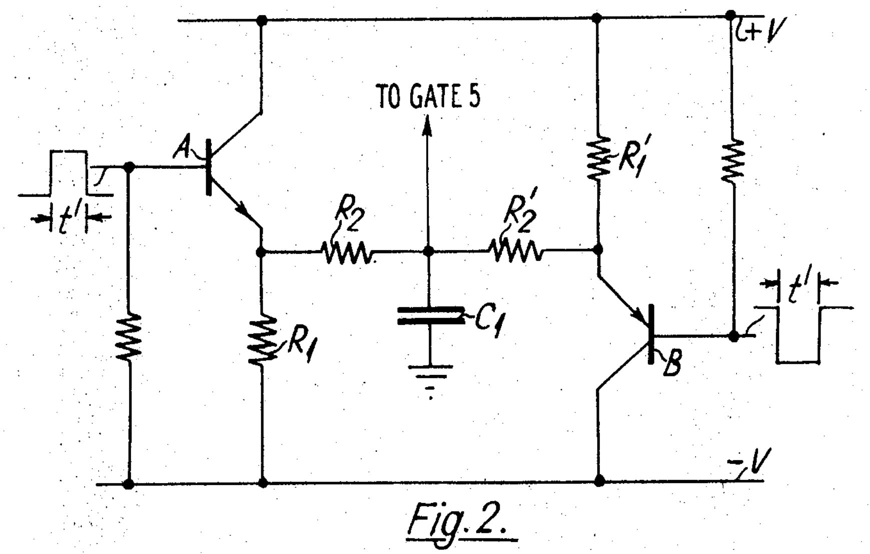
FIG. 2 is a schematic diagram of the expander of FIG. 1.

Expander 4 is illustrated in greater detail in FIG. 2, The PWM input if positive is steered to the base of transistor A and if negative to the base of transistor B. Thus, transistor A only conducts when a positive PWM input appears at its base and transistor B only conducts when a negative PWM input appears at its base. In either case, the transistor which is not conducting receives no input and remains turned off. When transistor A conducts, capacitor $C_1$ charges up positively through resistor $R_2$. The trailing edge of the PWM input at time $t'$ cuts off transistor A and capacitor $C_1$ discharges to zero through the symmetrical network of resistors $R_1$, $R_1'$, $R_2$ and $R_2'$, where $R_1=R_1'$ and $R_2=R_2'$. Similarly, if the PCM code represents a negative sample then a negative going PWM pulse is applied to the base of transistor B. This negative PWM input renders transistor B conductive and capacitor $C_1$ is charged negatively through resistor $R_2'$. When the trailing edge of the PWM input occurs at time $t'$, transistor B is cut off and capacitor $C_1$ is again discharged by the symmetrical network of resistors $R_1$, $R_1'$, $R_2$ and $R_2'$. Consider the application of a positive pulse to the base of transistor A.

Figure 3:
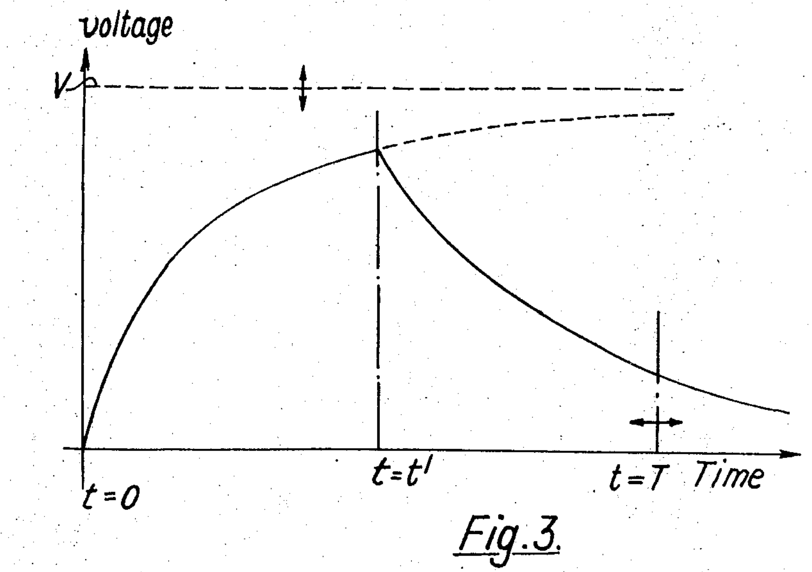
FIG. 3 is a graphical illustration of the voltages appearing on capacitor $C_1$ in FIG. 2.

If $R_1=2R_2+3r$, where $r$ is the output impedance of the transistor, the voltage $v$ across $C_1$ will rise, FIG. 3, as an inverse exponential towards the supply line voltage V for the period $t'$:

$$v=(1-e^{-2\alpha t})V \qquad (1)$$

after the period $t'$ (the width of the PWM signal), the voltage will fall exponentially at a rate $e^{-\alpha}{}_{t}$ FIG. 3, so that after a time T, the voltage across capacitor $C_1$ will be $$v=(1-e^{-2\alpha t})Ve^{-\alpha(T-t)}$$
$$=2e^{-\alpha T}V \sin h\alpha t \qquad (2)$$

If the input is negative, the voltage across the capacitor after a time T will be $-2e^{-\alpha T}V \sin h\alpha t$.

Thus, by sampling the voltage across the capacitor $C_1$ at a time T, a hyperbolic sine law expansion is obtained.

Since the output voltage is $\pm 2Ve^{\alpha - T} \sin h\alpha t$, the output of the decoder is directly proportional to the supply voltage V. This can lead to a change of gain and/or change of zero point, if the supply voltage changes. The zero shift only causes the D.C. level of the output signal to change, and no decoding errors occur.

If T is made a special function of V, the analog gain of the decoder can be made independent of V.

Let $$T=\frac{1}{\alpha}\log_e kV \qquad (3)$$

then $$v=2Ve-\alpha\left(\frac{1}{\alpha}\log_e kV\right)\sin h\alpha t$$
$$=\frac{2}{k}\sin h\alpha t$$

Figure 4:
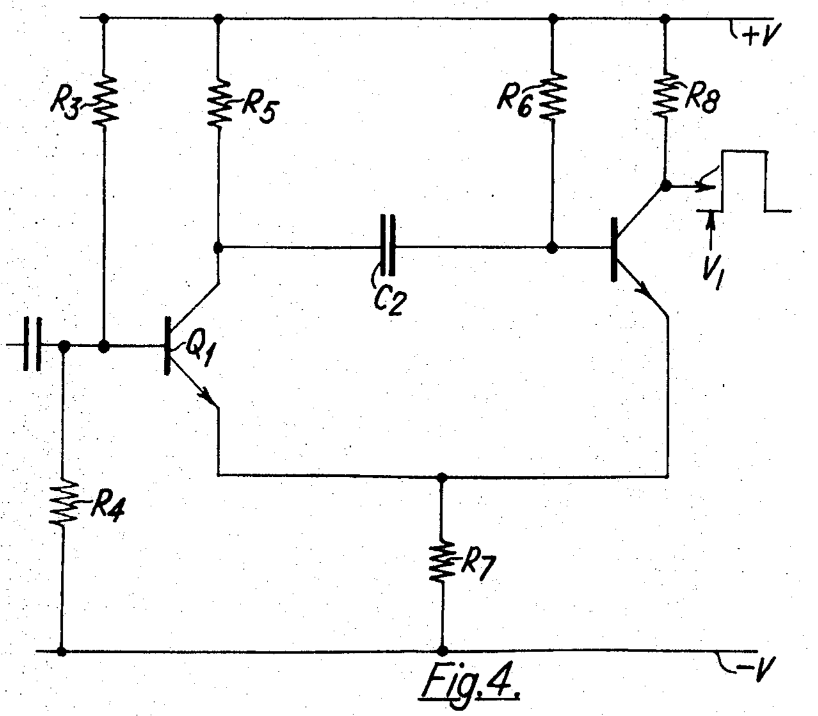
FIG. 4 is a schematic diagram of the self-compensating monostable trigger circuit of FIG. 1.

The sampling of the capacitor C in FIG. 2 is under the control of a pulse derived from the start of the coding period via variable delay circuit 6 of FIG. 1, which is an emitter coupled monostable circuit as shown in FIG. 4.

The circuit of FIG. 4 is powered by the same supply voltage as expandor 4. The pulse width of an emitter coupled monostable circuit is related to the supply voltage by the equation $$T_D=(R_6+R_5)C_2\log_e\left(\frac{V-V_1+aI_{e1}R_5}{V-I_{e1}R_7}-\frac{V_{BE}k_1k_2}{V}\right) \qquad (4)$$

where $$k_1=\frac{R_4+R_3}{R}$$

and $$k_2=\frac{R_7+R_5}{R_7}$$

(FIG. 4) and $a$=common base current gain of $Q_1$. Equation 4 may be written $$T_D=\tau\log_e\left(N-\frac{V_{BE}R_3R_4}{V}\right) \qquad (5)$$

since N is independent of V.

Although this is not the ideal form, it has been found that it can be closely approximated. In practice the "on" time of the monostable circuit of FIG. 4 can be made to approximate the law $$T_D=\frac{1}{\alpha}\log_e RV$$

The design procedure is as follows.

If $R_5 \simeq R_8 \simeq R_7$, then $T_D \cong 0.60(R_6+R_5)C_2$. Therefore, $R_6$, $R_5$ and $C_2$ are chosen to give the required delay, and $R_8$ and $R_7$ made approximately equal to $R_5$.

The bias resistors $R_3$ and $R_4$, to which $k_1$ is related, control the shape of the pulse width/voltage curve, and these resistors are selected to give a curve closely approximating the ideal one of Equation 3. The value of $C_2$ is then chosen to keep the pulse at the desired width when the supply voltage is at its nominal voltage. Care must be taken to ensure that transistor $Q_1$ is off when no trigger pulse is present.

Figure 5:
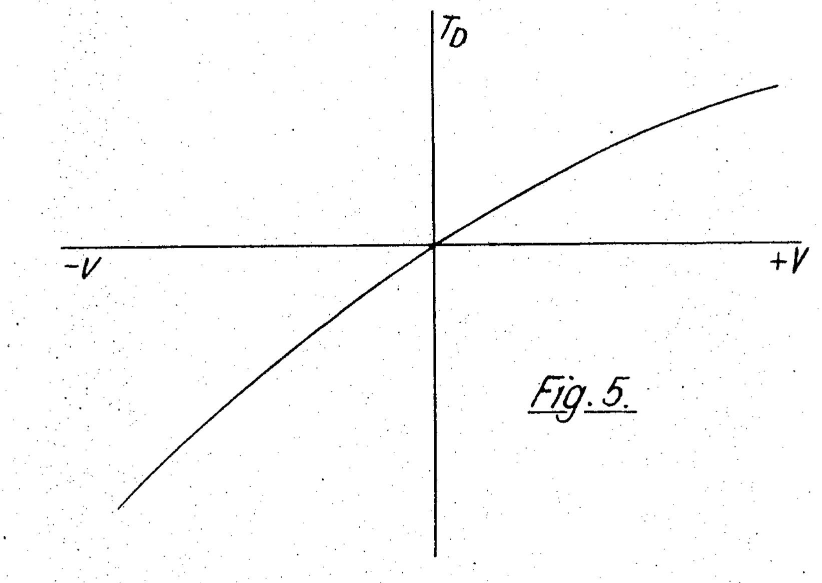
FIG. 5 is a graphical illustration of the change in the time constant of FIG. 4 due to changes in the supply voltage.
Figure 6:
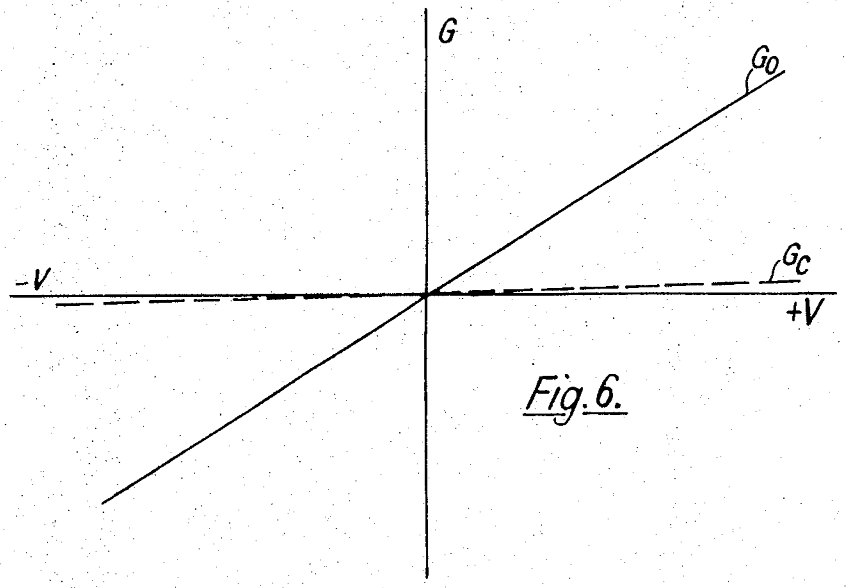
FIG. 6 is a graphical illustration of the compensation effect in the decoder of FIG. 1 due to the circuit of FIG. 4.

The variation of the delay $T_D$ with changes in supply voltage V is depicted in FIG. 5. The delay $T_D$ is increased as the voltage rises. When the voltage rises capacitor $C_1$ of FIG. 2 will reach a higher condition of charge in the period $t'$ and to ensure that the final sampled voltage is correct it must be allowed to discharge for a slightly longer time than normal. Therefore, the delay $T_D$ must be increased. The uncompensated gain and compensated gain of a circuit such as that shown in FIG. 1 are illustrated in FIG. 6, in which the uncompensated gain is shown as a solid line and the compensated gain is shown by a broken line. In a laboratory trial, the circuit described above was found to keep the decoder gain constant to within ±0.2% when the supply voltage changed by as much as ±20%.

In the circuit of FIG. 1, it is convenient to use delay circuit 6 to trigger a pulse generating monostable circuit 7 which produces the actual sampling pulse for sampling the charge on the capacitor by means of sampling gate 5. The use of a compensating emitter coupled monostable circuit as the delay circuit 6 is convenient as it means that no extra components are required to make the circuit of FIG. 1 self-compensating for supply voltage variations.

While we have described above the principle of our invention in connection with specific apparatus, it is to be clearly understood that this description is made only by way of example and not as a limitation to the scope of our invention as set forth in the objects thereof and in the accompanying claims.

We claim:

1. A non-linear decoder comprising:
a first source of code signal;
a second source of supply voltage;
first means coupled to said first source and said second source to generate a first non-linear waveform in response to said supply voltage and said code signal, said first waveform having a fixed initial amplitude and varying therefrom according to a first law for a first time proportional to the numerical value represented by said code signal;
second means coupled to said first means for generating a second non-linear waveform having an initial amplitude determined by the amplitude of said first waveform at the end of said first time and varying therefrom according to a second given law; and third means coupled to said second means and said second source to sample said second waveform at a second time greater than said first time to provide an output signal for said decoder;

said third means providing a variable second time in response to fluctuations of said supply voltage in such a way that error in said output signal due to fluctuations in said supply voltage is compensated for.

2. A decoder according to claim 1, wherein:

said first waveform is an exponentially rising waveform having an initial amplitude equal to zero.

3. A decoder according to claim 1, wherein:

said second waveform is an exponentially falling waveform.

4. A decoder according to claim 1, wherein:

said first waveform is an exponentially rising waveform having an initial amplitude equal to zero; and said second waveform is an exponentially falling waveform.

5. A decoder according to claim 1, wherein:

said first means includes;

a capacitor coupled to said second source, and fourth means coupled to said first source and said capacitor to control the charging of said capacitor toward said supply voltage for a time equal to said first time; and said second means includes;

a resistor network coupled to said capacitor to discharge said capacitor for a time from said first time to said second time.

6. A decoder according to claim 5, wherein:

said fourth means includes;

sixth means coupled to said first source to convert said code signal into a width modulated pulse having a width proportional to said numerical value represented by said code signal, and seventh means to couple said width modulated pulse from said sixth means to said capacitor to control the charging thereof.

7. A decoder according to claim 1, wherein:

said third means includes;

a trigger circuit having a time constant network coupled to said second source to provide said second time dependent on the fluctuations of said supply voltage.

8. A decoder according to claim 7, wherein:

said trigger circuit is a monostable circuit.

9. A decoder according to claim 8, wherein:

said monostable circuit is an emitter-coupled monostable circuit.

10. A decoder according to claim 1, wherein:

said first means includes;

a capacitor coupled to said second source, fourth means coupled to said first source to convert said code signal into a width modulated pulse having a width proportional to said numerical value represented by said code signal, and fifth means to couple said width modulated pulse from said fourth means to said capacitor to control the charging of said capacitor toward said supply voltage for a time equal to said first time;

said second means includes;

a resistor network coupled to said capacitor to discharge said capacitor for a time from said first time to said second time; and said third means includes;

a monostable circuit having a time constant network coupled to said second source to provide said second time dependent on the fluctuations of said supply voltage.

References Cited

UNITED STATES PATENTS

| | | | |
|---|---|---|---|
| 2,669,706 | 2/1954 | Gray | 328—119X |
| 2,832,070 | 5/1958 | Bateman | 328—119X |
| 3,287,570 | 11/1966 | Wilson | 328—151X |
| 3,428,829 | 2/1969 | Hayme et al. | 328—151X |
| 3,470,387 | 9/1969 | Reeves et al. | 328—119X |

DONALD D. FORRER, Primary Examiner

R. C. WOODBRIDGE, Assistant Examiner

U.S. Cl. X.R.

179—15; 307—231, 246; 328—151